(12) United States Patent
Giebel et al.

(10) Patent No.: US 9,016,578 B2
(45) Date of Patent: Apr. 28, 2015

(54) APPARATUS FOR AND METHOD OF ELECTRO-OPTICALLY READING A TARGET IN THE PRESENCE OF AMBIENT LIGHT BY SUPPRESSING THE AMBIENT LIGHT

(71) Applicant: Symbol Technologies, Inc., Schaumburg, IL (US)

(72) Inventors: James R. Giebel, Centerport, NY (US); Peter Fazekas, Bayport, NY (US); David P. Goren, Smithtown, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 51 days.

(21) Appl. No.: 13/893,431

(22) Filed: May 14, 2013

(65) Prior Publication Data
US 2014/0339310 A1    Nov. 20, 2014

(51) Int. Cl.
G06K 7/10    (2006.01)
G06K 7/14    (2006.01)

(52) U.S. Cl.
CPC ............ G06K 7/146 (2013.01); G06K 7/10722 (2013.01); G06K 7/10851 (2013.01)

(58) Field of Classification Search
CPC .................................................. G06K 7/10851
USPC .................. 235/454, 462.01, 462.42, 462.06, 235/462.25, 462.29, 455
See application file for complete search history.

(56) References Cited

U.S. PATENT DOCUMENTS

| | | | |
|---|---|---|---|
| 4,694,182 A | | 9/1987 | Howard |
| 5,192,856 A | * | 3/1993 | Schaham ................. 235/462.24 |
| 5,491,330 A | * | 2/1996 | Sato et al. ............... 250/214 AL |
| 5,561,283 A | | 10/1996 | Dvorkis et al. |
| 5,612,529 A | | 3/1997 | Coleman |
| 5,852,286 A | | 12/1998 | Coleman |
| 6,018,364 A | | 1/2000 | Mangelsdorf |
| 6,073,851 A | * | 6/2000 | Olmstead et al. ........ 235/462.45 |
| 6,219,438 B1 | * | 4/2001 | Giordano et al. ............. 382/110 |
| 6,360,949 B1 | | 3/2002 | Shepard et al. |

(Continued)

FOREIGN PATENT DOCUMENTS

EP    0 364 676 A2    4/1990

OTHER PUBLICATIONS

Non Final Office Action mailed Mar. 10, 2014 in U.S. Appl. No. 13/895,670, James R. Giebel et al., filed May 16, 2013.

(Continued)

Primary Examiner — Paultep Savusdiphol
(74) Attorney, Agent, or Firm — Nong-Qiang Fan (57) ABSTRACT

A reader for electro-optically reading a target in the presence of ambient light to be suppressed, includes a laser for emitting a laser beam, a scan component for scanning the laser beam across the target, a photodetector for detecting return laser light from the target to generate an information signal bearing information related to the target, and for concomitantly detecting the ambient light to generate an ambient light signal, and signal processing circuitry for measuring the ambient light signal, for processing both the information signal and the ambient light signal in one mode of operation when the measured ambient light signal is below a threshold, and for suppressing the ambient light signal and for processing only the information signal in another mode of operation when the measured ambient light signal at least equals the threshold.

19 Claims, 5 Drawing Sheets

(56) References Cited

U.S. PATENT DOCUMENTS

| | | | |
|---|---|---|---|
| 7,267,283 B2 | 9/2007 | Schneider et al. | |
| 7,441,703 B2 | 10/2008 | Moon et al. | |
| 7,446,806 B2 | 11/2008 | Carlson et al. | |
| 8,028,917 B2 | 10/2011 | Giebel | |
| 8,063,964 B2 | 11/2011 | Kozlowski | |
| 8,081,243 B2 | 12/2011 | Chou | |
| 8,087,589 B2* | 1/2012 | Heinrich et al. | 235/462.29 |
| 2002/0117547 A1 | 8/2002 | Krichever | |
| 2005/0141069 A1 | 6/2005 | Wood et al. | |
| 2005/0258249 A1* | 11/2005 | Giebel et al. | 235/462.11 |
| 2007/0063048 A1 | 3/2007 | Havens et al. | |
| 2007/0069027 A1 | 3/2007 | Madej | |
| 2008/0017800 A1* | 1/2008 | Benni | 250/339.07 |
| 2009/0084853 A1 | 4/2009 | Giebel et al. | |
| 2009/0114727 A1* | 5/2009 | Heinrich et al. | 235/462.25 |

OTHER PUBLICATIONS

Notice of Allowance mailed Apr. 15, 2014 in U.S. Appl. No. 13/895,670, James R. Giebel et al., filed May 16, 2013.
Notice of Allowance mailed Jul. 18, 2014 in U.S. Appl. No. 13/895,670, James R. Giebel et al., filed May 16, 2013.
Notice of Allowance mailed Sep. 23, 2014 in U.S. Appl. No. 14/050,027, Gary G. Schneider et al., filed Oct. 9, 2013.

* cited by examiner

APPARATUS FOR AND METHOD OF ELECTRO-OPTICALLY READING A TARGET IN THE PRESENCE OF AMBIENT LIGHT BY SUPPRESSING THE AMBIENT LIGHT

FIELD OF THE DISCLOSURE

The present disclosure relates generally to an apparatus for, and a method of, electro-optically reading a target in the presence of ambient light and, more particularly, to suppressing the ambient light, especially when emitted from fluorescent lamps and light emitting diodes (LEDs) operated at kilohertz frequencies.

BACKGROUND

Moving laser beam readers or laser scanners have long been used as data capture devices to electro-optically read targets, such as one-dimensional bar code symbols, particularly of the Universal Product Code (UPC) type, printed on labels associated with products in many venues, such as supermarkets, warehouse clubs, department stores, and other kinds of retailers, as well as many other venues, such as libraries and factories. The moving laser beam reader generally includes a housing, a laser for emitting a laser beam, a focusing lens assembly for focusing the laser beam to form a beam spot having a certain size at a focal plane in a range of working distances relative to the housing, a scan component for repetitively scanning the beam spot across a target in a scan pattern, for example, a scan line or a series of scan lines, across the target multiple times per second, and a photodetector for detecting return light reflected and/or scattered from the target and for converting the detected return light into an analog electrical information signal bearing information related to the target. This analog electrical information signal varies in amplitude as a function of time due to the time-varying return light along each scan line, and varies in frequency as a function of the density of the symbol, as well as the distance at which the symbol is being read. The moving laser beam reader also includes signal processing receiver circuitry including a digitizer for digitizing the variable analog information signal, and a microprocessor for decoding the digitized signal based upon a specific symbology used for the target. The decoded signal identifies the product and is transmitted to a host, e.g., a cash register in a retail venue, for further processing, e.g., product price look-up or product inventorying.

In one advantageous embodiment, during operation of the moving laser beam reader in a venue having one or more external light sources that emit ambient light, an operator holds the housing in his or her hand, and aims the housing at the target, and then initiates the data capture and the reading of the target by manual actuation of a trigger on the housing. The ambient light is also concomitantly detected by the photodetector, which generates an analog electrical ambient light signal. In the event that the external source is sunlight, then the ambient light is substantially constant in magnitude, and therefore, the analog electrical ambient light signal has a constant illumination DC component. In the event that the external source is an incandescent bulb or a fluorescent lamp energized at 50 Hz or 60 Hz, then the analog electrical ambient light signal has a constant illumination DC component and a relatively small time-varying AC frequency component at 50 Hz or 60 Hz. In the event that the fluorescent lamp is operated at higher frequencies for greater luminous efficiency, or in the event that the external source includes light emitting diodes (LEDs) operated at higher frequencies, then the analog electrical ambient light signal has a constant illumination DC component and a relatively larger time-varying AC frequency component at kilohertz frequencies, typically anywhere from 30 kHz to 300 kHz.

In some circumstances, the presence of the ambient light signal interferes with, and weakens, the information signal. To prevent such interference, the constant illumination DC component of the ambient light signal can generally be filtered out from the information signal. Also, filters can be used to suppress the ambient light signal when its time-varying frequency component is very far in frequency away from the frequency of the information signal. However, if the time-varying frequency component of the ambient light signal is too close in frequency to the frequency of the information signal, then the ambient light signal can interfere and impede the decoding of the information signal, thus degrading the performance of the reader. By way of non-limiting example, an information signal of about 50 kHz can be generated during reading of a low density symbol located relatively close to the reader, e.g., about 10 inches away. If the ambient light source includes LEDs operated at about 50 kHz, then the respective frequencies of the ambient light signal and the information signal are too close and will cause an interference, and perhaps cause the symbol not to be successfully decoded and read.

Accordingly, there is a need to suppress such interference caused by such ambient light to enhance reader performance.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions and locations of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

One aspect of this disclosure relates to a reader for electro-optically reading a target, e.g., a bar code symbol, in the presence of ambient light to be suppressed. The reader includes a laser, typically a semiconductor laser diode, for emitting a laser beam. The reader also includes a scan component for scanning the laser beam across the target for reflection and scattering therefrom as return laser light. The reader also includes a photodetector for detecting the return laser light from the target and for converting the detected return light into an analog electrical information signal bearing information related to the target, and for concomitantly detecting the ambient light and for converting the detected ambient light into an analog electrical ambient light signal. The reader further includes signal processing circuitry having a controller, e.g., a microprocessor, for measuring the ambient light signal, for processing both the information signal and the ambient light signal in one mode of operation when the measured ambient light signal is below a threshold, and for suppressing the ambient light signal and for processing only the information signal in another mode of operation when the measured ambient light signal at least equals, and preferably exceeds, the threshold.

Advantageously, the controller is operative for energizing the laser between an energized state and a deenergized state, and the measuring of the ambient light signal is performed in the deenergized state of the laser. This can occur either prior to a reading session during a setup or calibration mode, and/or at periodic intervals during the reading session. For example, in the latter case, the laser can be deenergized for a short interval, e.g., 1 ms, in the center, or any other part, of a scan, once every twenty scans, or so. The controller is also operative for moving the scan component to sweep the laser beam in a scan, and the measuring of the ambient light signal may be performed prior to moving the scan component.

In one embodiment, the signal processing circuitry includes a correlated double sampling (CDS) circuit for suppressing the ambient light signal, and a control switch having two switching states. The controller is operative for switching the control switch to one of the switching states in which the CDS circuit is bypassed during the one mode of operation, and for switching the control switch to the other of the switching states in which both the information signal and the ambient light signal are conducted to the CDS circuit during the other mode of operation.

In another embodiment, the signal processing circuitry includes a bandpass filter for suppressing the ambient light signal, and a control switch having two switching states. The controller is operative for switching the control switch to one of the switching states in which the bandpass filter is bypassed during the one mode of operation, and for switching the control switch to the other of the switching states in which both the information signal and the ambient light signal are conducted to the bandpass filter during the other mode of operation.

A method, in accordance with another aspect of this disclosure, of electro-optically reading a target in the presence of ambient light to be suppressed, is performed by emitting a laser beam; by scanning the laser beam across the target for reflection and scattering therefrom as return laser light; by detecting the return laser light from the target, and converting the detected return light into an analog electrical information signal bearing information related to the target; by concomitantly detecting the ambient light, and converting the detected ambient light into an analog electrical ambient light signal; by measuring the ambient light signal; by processing both the information signal and the ambient light signal in one mode of operation when the measured ambient light signal is below a threshold; and by suppressing the ambient light signal and processing only the information signal in another mode of operation when the measured ambient light signal at least equals the threshold.

Figure 1:
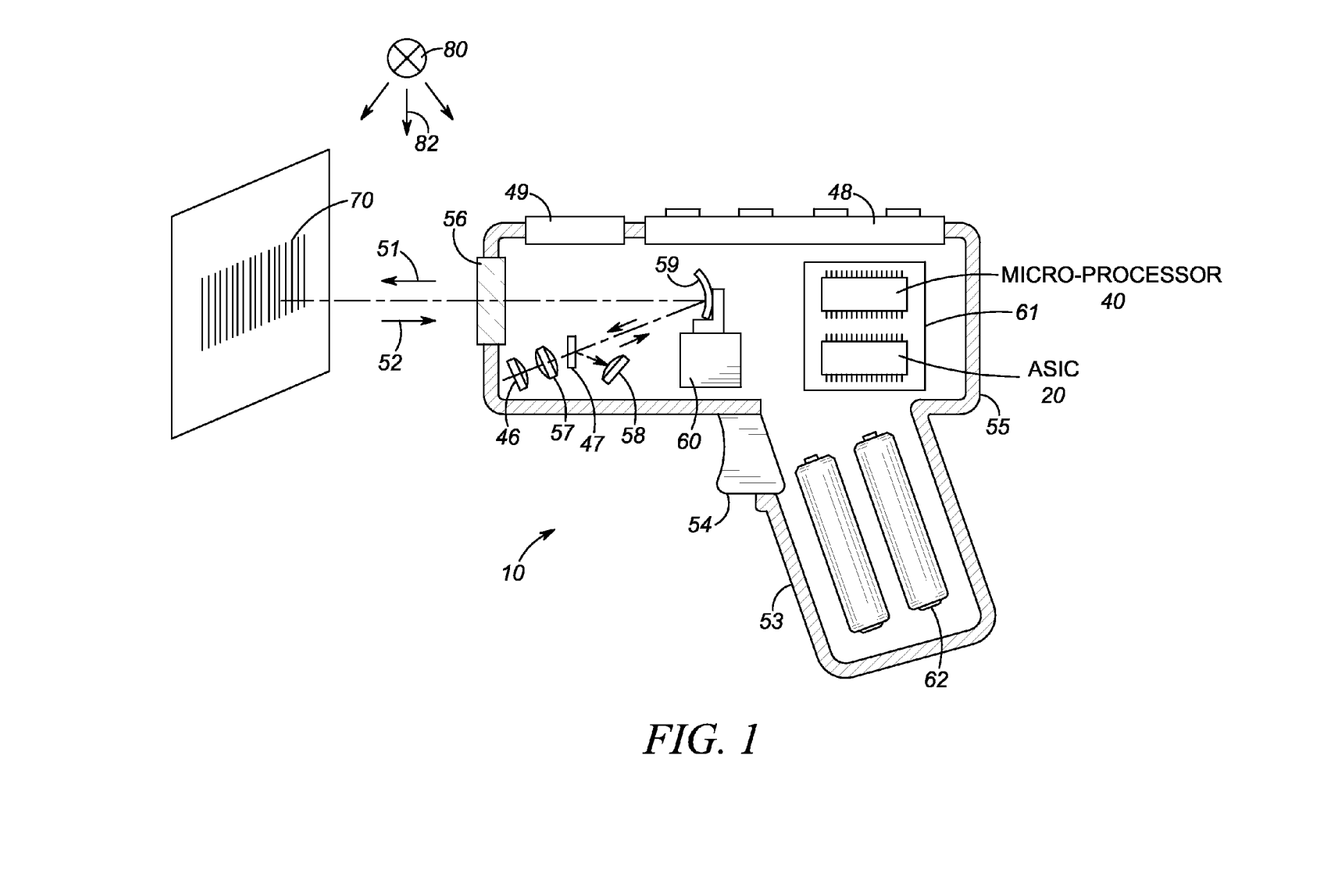
FIG. 1 is a schematic view of a handheld moving laser beam reader apparatus operative for suppressing an ambient light signal in accordance with the present disclosure.

Turning now to the drawings, FIG. 1 depicts a handheld, moving laser beam reader 10 implemented in a gun-shaped housing 55 having a pistol-grip type of handle 53. The housing 55 contains a laser light source 46, preferably a semiconductor laser diode, for emitting an outgoing laser beam 51 to a target, such as a bar code symbol 70, for reflection and scattering therefrom; a photodetector 58, preferably a photodiode, for detecting incoming light 52; a focusing optical assembly 57, preferably one or more focusing lenses, for focusing the outgoing laser beam 51 as a beam spot on the symbol 70; an application specific integrated circuit (ASIC) 20 mounted on a printed circuit board (PCB) 61; a programmed microprocessor or controller 40, also preferably mounted on the PCB 61; and a power source or battery 62, preferably mounted in the handle 53. A light-transmissive window 56 at a front end of the housing 55 allows the outgoing laser light beam 51 to exit the housing 55, and the incoming light 52 to enter the housing 55. A user holds the reader 10 by the handle 53, and aims the reader 10 at the symbol 70, preferably at a distance away from the symbol 70. To initiate reading, the user pulls a trigger 54 on the handle 53. The reader 10 may optionally include a keyboard 48 and a display 49 readily accessible to the user.

As further depicted in FIG. 1, the laser beam 51 emitted by the laser light source 46 passes through a partially-silvered mirror 47 to a scan component or oscillating scan mirror 59, which is coupled to a drive motor 60, preferably energized when the trigger 54 is manually pulled. The oscillation of the mirror 59 causes the outgoing laser beam 51 to sweep back and forth in a desired scan pattern, e.g., a scan line, across the symbol 70. A variety of mirror and motor configurations can be used to move the laser beam in the desired scan pattern. For example, the mirror 59 need not be a concave mirror as illustrated, but could be a planar mirror that is repetitively and reciprocally driven in alternate circumferential directions about a drive shaft on which the planar mirror is mounted.

As further depicted in FIG. 1, the incoming light 52 may have two light components that come from two different sources. The first light component is return laser light derived from the laser light source 46 and is generated by reflection and/or scattering of the laser light beam 51 back by the symbol 70 through the window 56. The second light component is ambient light 82 derived from an external ambient light source 80 operative for emitting the ambient light 82. As described above, the external light source 80 at a venue can be sunlight, one or more incandescent bulbs, one or more fluorescent lamps, one or more light emitting diodes (LEDs), and the like. In the exemplary reader 10 shown in FIG. 1, the incoming light 52 reflects off of the scan mirror 59 and the partially-silvered mirror 47 and impinges on the detector 58. The detector 58 produces an analog electrical output signal proportional to the intensity of the return light 52. A first component signal of the output signal of the return light 52 that is returned from the symbol 70 and that is derived from the laser light from the laser light source 46 is hereinafter described as an "information" signal ($V_{ABP}$) bearing information related to the symbol 70. The subscript ABP is an abbreviation for analog bar pattern. A second component signal of the output signal of the return light 52 that is derived from the ambient light source 80 is hereinafter described as an "ambient light" or "interfering" signal ($V_{AMB}$).

As also described above, when fluorescent lamps and LEDs are operated at kilohertz frequencies, there are circumstances where the time-varying frequency component of the ambient light signal $V_{AMB}$ is too close in frequency to the frequency of the information signal $V_{ABP}$, in which event the ambient light signal $V_{AMB}$ can interfere and impede the decoding of the information signal $V_{ABP}$, thus degrading the performance of the reader 10. By way of non-limiting example, an information signal $V_{ABP}$ of about 50 kHz can be generated during reading of a low density symbol 70 located relatively close to the reader 10, e.g., about 10 inches away. If the LEDs are operated at about 50 kHz, then the respective frequencies of the ambient light signal $V_{AMB}$ and the information signal $V_{ABP}$ are too close and will cause an interference, and perhaps cause the symbol 70 not to be successfully read. One aspect of this disclosure is to suppress such interference.

Figure 2:
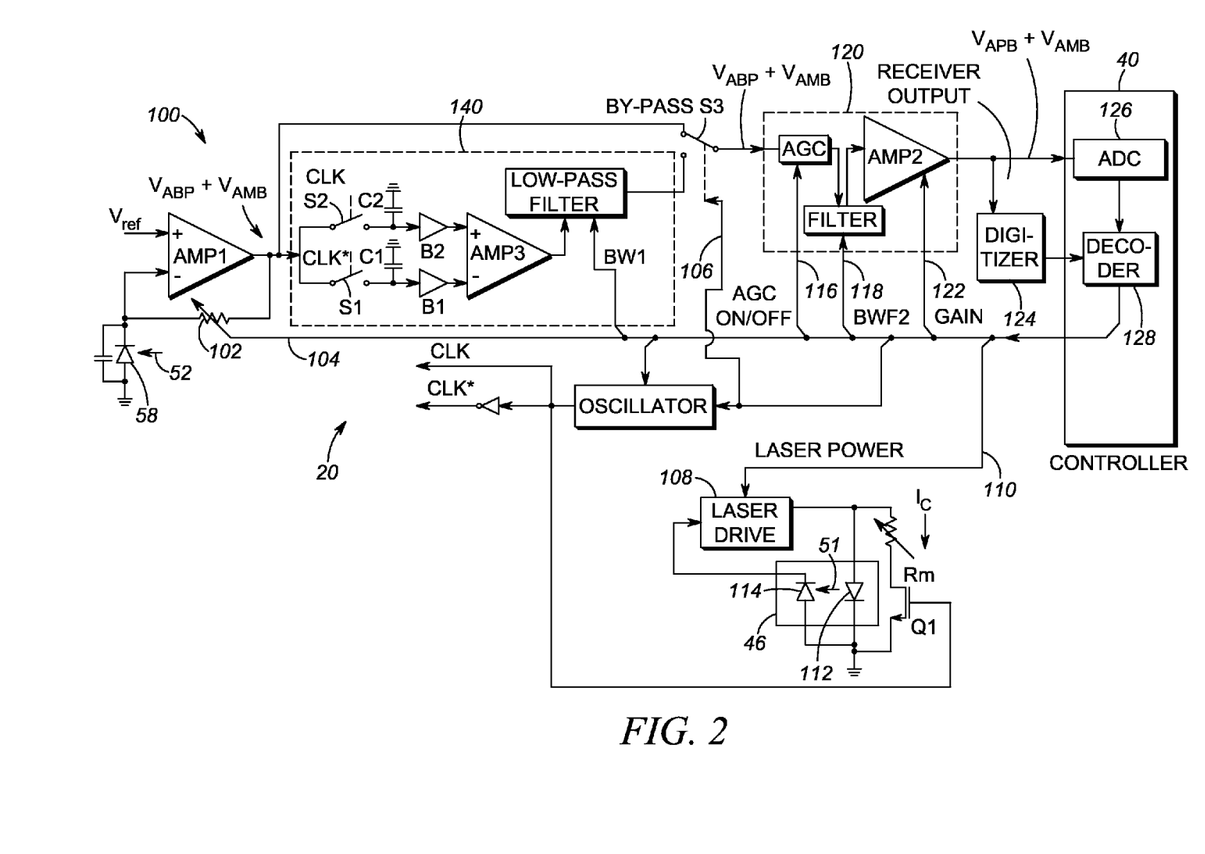
FIG. 2 is an electrical circuit schematic of one embodiment of a signal processing receiver circuit in one mode of operation for use in the apparatus of FIG. 1.
Figure 3:
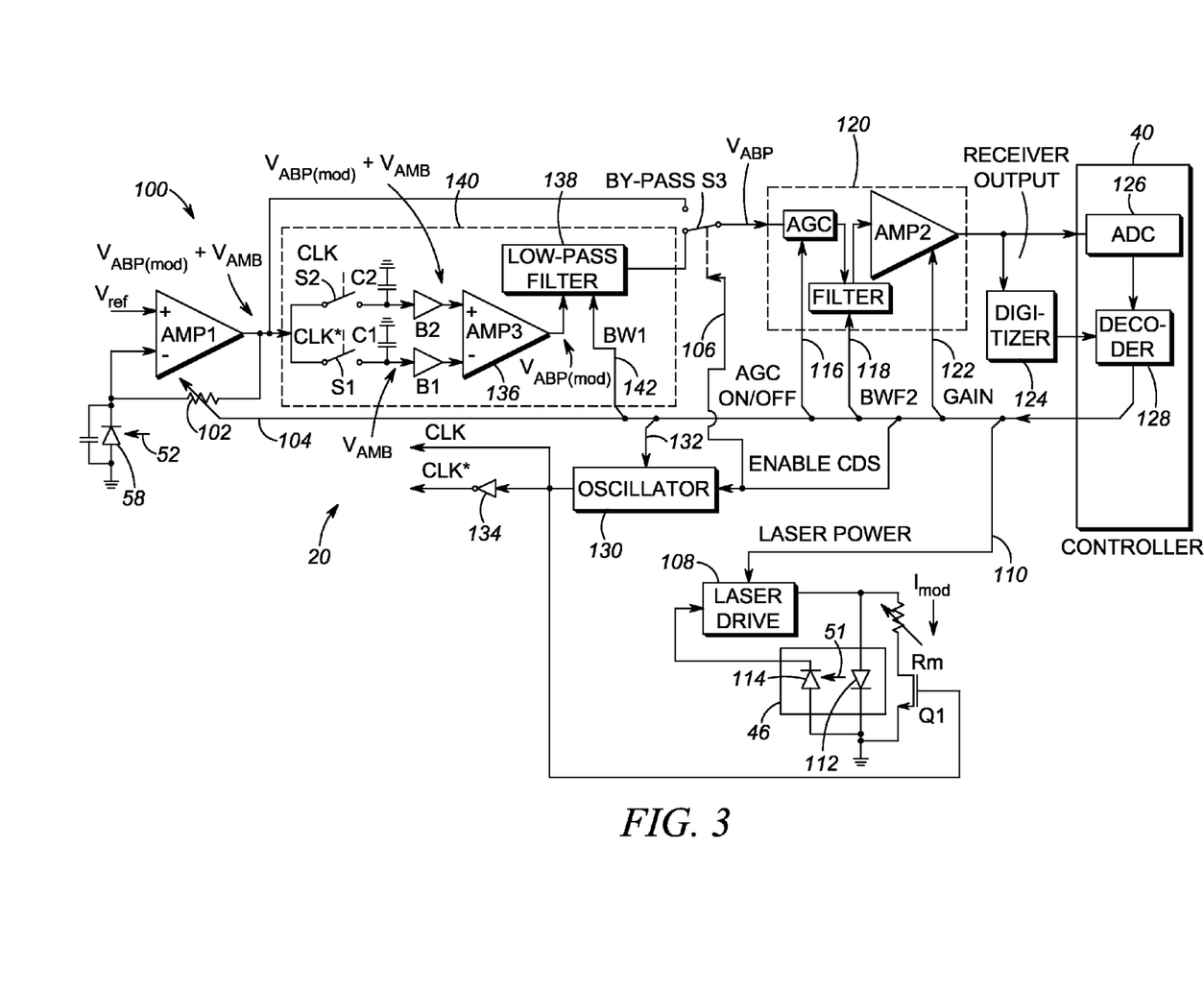
FIG. 3 is analogous to FIG. 2, but in another mode of operation.

The ASIC 20, as shown in the embodiment of FIGS. 2-3, includes a signal processing receiver circuit connected to the photodetector 58, which, as described above, outputs a combined output signal ($V_{ABP}+V_{AMB}$) that is the sum of the information signal $V_{ABP}$ and the ambient light signal $V_{AMB}$. The signal processing receiver circuit includes a front-end receiver section 100 having at least one amplifier (AMP1), advantageously configured as a transimpedance amplifier, to increase the gain of the analog electrical combined output signal ($V_{ABP}+V_{AMB}$) received from the photodetector 58. The gain of the amplifier AMP1 can be adjusted by varying a resistor 102 via a control line 104 connected to the controller 40. The combined output signal ($V_{ABP}+V_{AMB}$) is either directly conducted to a back-end receiver section 120 in a first mode of operation by having the controller 40 switch a bypass switch S3 via a control line 106 to a first switching state as depicted in FIG. 2, or is directly connected to an ambient light suppression circuit 140 in a second mode of operation by having the controller 40 switch the bypass switch S3 via the control line 106 to a second switching state as depicted in FIG. 3.

The switching of the bypass switch S3 is determined by the signal processing receiver circuit by measuring the ambient light signal $V_{AMB}$. If the measured ambient light signal $V_{AMB}$ is below a threshold value, then the presence of the ambient light signal $V_{AMB}$ can be tolerated and, hence, the combined output signal ($V_{ABP}+V_{AMB}$) is sent to the back-end receiver section 120 in the first mode of operation depicted in FIG. 2. If the measured ambient light signal $V_{AMB}$ equals or exceeds the threshold value, then the presence of the ambient light signal $V_{AMB}$ will interfere with the reading of the symbol 70 and, hence, the ambient light signal $V_{AMB}$ must be suppressed by the suppression circuit 140, and only the information signal $V_{ABP}$ is sent to the back-end receiver section 120 in the second mode of operation depicted in FIG. 3.

The measuring of a magnitude and/or a frequency of the ambient light signal $V_{AMB}$ can be performed by the controller 40 in various ways. As described below, the controller 40 is operative for energizing the laser light source 46 between an energized state and a deenergized state, and for measuring the magnitude of the ambient light signal in the deenergized state, either prior to a reading session during a setup or calibration mode, and/or at periodic intervals during the reading session. For example, in the latter case, the laser light source 46 can be deenergized for a short interval, e.g., 1 ms, in the center, or any other part, of a scan, once every twenty scans, or so.

The controller 40 controls the laser light source 46 with a laser drive circuit 108 via a control line 110. The laser drive circuit 108 includes a laser power regulator, which is a closed loop feedback system that maintains a constant optical output power by varying the applied forward continuous current $I_c$ to the laser light source 46. The laser light source 46 includes a laser diode 112 and a monitor photodiode 114. A small fraction of the output laser light is coupled into the monitor photodiode 114 within the enclosed laser light source 46. This induces a photocurrent in the monitor photodiode 114 that is proportional to the laser output power. This photocurrent is a negative feedback signal that is used to regulate the laser's output power. Thus, the controller 40 can either turn the laser light source 46 on to the energized state, or turn the laser light source 46 off to the deenergized state.

As described above, the controller 40 moves the scan component 59 to sweep the laser beam in a scan. The measuring of the magnitude of the ambient light signal can also be performed in the calibration mode prior to moving the scan component 59. In addition, the controller 40 can measure the frequency of the ambient light signal by executing a fast Fourier transform (FFT) on the ambient light signal.

Thus, in one embodiment, the ambient light signal $V_{AMB}$ of the combined output signal ($V_{ABP}+V_{AMB}$) received from the photodetector 58 is measured when the laser light source 46 is turned off, i.e., when $V_{ABP}=0$, using the front-end receiver section 100, the back-end receiver section 120, and the controller 40. Advantageously, the threshold value is determined when the gain of the front-end receiver section 100 and the back-end receiver section 120 is fixed. Alternatively, this threshold value can be stored in advance in a memory of the controller 40. When the ambient light signal $V_{AMB}$ is less than the threshold value, then the controller 40 switches the bypass switch S3 to the state depicted in FIG. 2, and when the ambient light signal $V_{AMB}$ equals or exceeds the threshold value, then the controller 40 switches the bypass switch S3 to the state depicted in FIG. 3.

Thus, in FIG. 2, the combined output signal ($V_{ABP}+V_{AMB}$) is conducted to the back-end receiver section 120, which includes an automatic gain controller (AGC) having an on/off control, at least one active low-pass filter stage having an adjustable cutoff frequency in its bandwidth to filter noise from the combined output signal, and an at least one amplifier (AMP2) having an adjustable gain to increase the gain of the combined output signal. Each of the AGC, low-pass filter, and the AMP2 has a control input connected to control lines 116, 118, 122, which can be adjusted under control of the microprocessor 40.

The signal processing receiver circuit also includes a digitizer 124 which digitizes the combined output signal by processing the same with differentiating circuits, peak detectors, multiplexers, logic elements, and comparators. The digitizer 124 processes the combined output signal from the back-end section 120 to produce a pulse signal where the widths and spacings between the pulses correspond to the widths of the bars and the spacings between the bars of the symbol 70. The digitizer 124 serves as an edge detector or wave shaper circuit, and threshold points set by the digitizer 124 determines what points of the combined output signal represent bar edges. The pulse signal from the digitizer 124 is applied to a decoder 128, typically incorporated as software in the programmed controller 40, which will also have associated program memory and random access data memory. The controller 40 also has an analog-to-digital converter (ADC) 126 connected to the decoder 128 and to the output of the back-end section 120. The decoder 128 first determines the pulse widths and spacings of the combined output signal from the digitizer 124. The decoder 128 then analyzes the widths and spacings to find and decode a legitimate bar code symbol. This includes analysis to recognize legitimate characters and sequences, as defined by the appropriate code standard. The controller 40 then communicates with an external host over an interface.

In FIG. 2, the presence of the ambient light signal $V_{AMB}$ is tolerated due to its low measurement. However, in FIG. 3, the presence of the ambient light signal $V_{AMB}$ cannot be tolerated due to its high measurement, which is why the suppression circuit 140 is employed to remove the ambient light signal $V_{AMB}$. The suppression circuit 140 in FIG. 3 is configured as a correlated double sampling (CDS) circuit having a pair of switches S1 and S2 which are pulsed out of phase with respect to each other. To use the CDS circuit 140, the controller 40 must pulse or modulate the laser light source 46 with the laser drive circuit 108 via the control line 110 so that a modulated current $I_{mod}$ is conducted to the laser light source 46. The laser light source 46 is pulsed at a rate or frequency sufficiently fast to accurately resolve the narrowest bar or space used in the type of bar code symbol 70 to be read. Typically, this amounts to several pulses during the period of time required for the scanning laser beam to scan across the narrowest bar or space of the bar code symbol 70.

As also shown in FIG. 3, the signal processing receiver circuit also includes an oscillator 130 that is controlled by the controller 40 via a control line 132. The oscillator 130 puts out a clock signal (CLK) which has the same frequency as that of the pulsed laser light source 46. An inverter 134 puts out an inverted clock signal (CLK*) which has the same frequency as the CLK signal, but which is 180 degrees out of phase therewith. The CLK* signal drives the switching of the switch S1, and the CLK signal drives the switching of the switch S2.

In FIG. 3, the photodetector 58 outputs a combined output signal ($V_{ABP(mod)} + V_{AMB}$) that is the sum of the modulated information signal $V_{ABP(mod)}$ and the ambient light signal $V_{AMB}$. This combined output signal is conducted to each switch S1 and S2. When the switch S2 is closed, the laser light source 46 is energized so that the combined output signal ($V_{ABP(mod)} + V_{AMB}$) passes through the switch S2 and is stored on capacitor C2. When the switch S1 is closed, the laser light source 46 is deenergized so that only the ambient light signal $V_{AMB}$ of the combined output signal ($V_{ABP(mod)} + V_{AMB}$) passes through the switch S1 ($V_{ABP(mod)} = 0$) and is stored on capacitor C1. The resulting stored signals are then buffered by buffers B1 or B2 and fed into a differencing amplifier 136 (AMP3), which receives the two buffered signals and subtracts the value of the combined output signal ($V_{ABP(mod)} + V_{AMB}$) from the value of the ambient light signal $V_{AMB}$, thereby resulting in just the modulated information signal $V_{ABP(mod)}$, which is then passed through a low-pass filter 138. The switching action of the switch S2 is synchronized with the pulsing of the laser light source 46, and functions as a demodulator, and moves the modulated information signal $V_{ABP(mod)}$ to baseband, thereby resulting in the information signal $V_{ABP}$, which is then conducted through the back-end section 120, the digitizer 124, and the decoder 128, as described above. The filter 138 has an adjustable cutoff frequency in its bandwidth (BW1) that is adjusted by the controller 40 via a control line 142. The filter 138 removes any carrier-related residue.

The suppression circuit 140 effectively suppresses the ambient light signal, but incurs a noise performance penalty, because receiver bandwidths need to be increased to support the high modulation frequency carrier. During demodulation in the suppression circuit 140, the noise in baseband is significantly increased. Also, about half of the output power of the laser light source 46 is lost during the modulation (50% duty cycle) to produce the carrier. To avoid this signal-to-noise (S/N) loss (and loss in reader performance), various adjustments can be made to the signal processing circuit. For example, the gain of the amplifier AMP1 over control line 104 can be increased to improve the signal-to-noise performance.

The clock frequency of the oscillator 130 can be lowered over control line 132 to improve fidelity and the signal-to-noise performance. The cutoff frequencies of the filters having bandwidths BW1, BW2 can be adjusted over control lines 142, 118 (the lower the bandwidth BW1, BW2, the lower the noise). Although not illustrated, the controller 40 also controls the scan motor drive 60 that oscillates a scan mirror to sweep the outgoing laser beam 51 over a scan angle. By reducing a magnitude of a drive signal that drives the motor drive 60, the bandwidth requirements in the signal processing receiver circuitry are reduced, thereby also improving the S/N.

Figure 4:
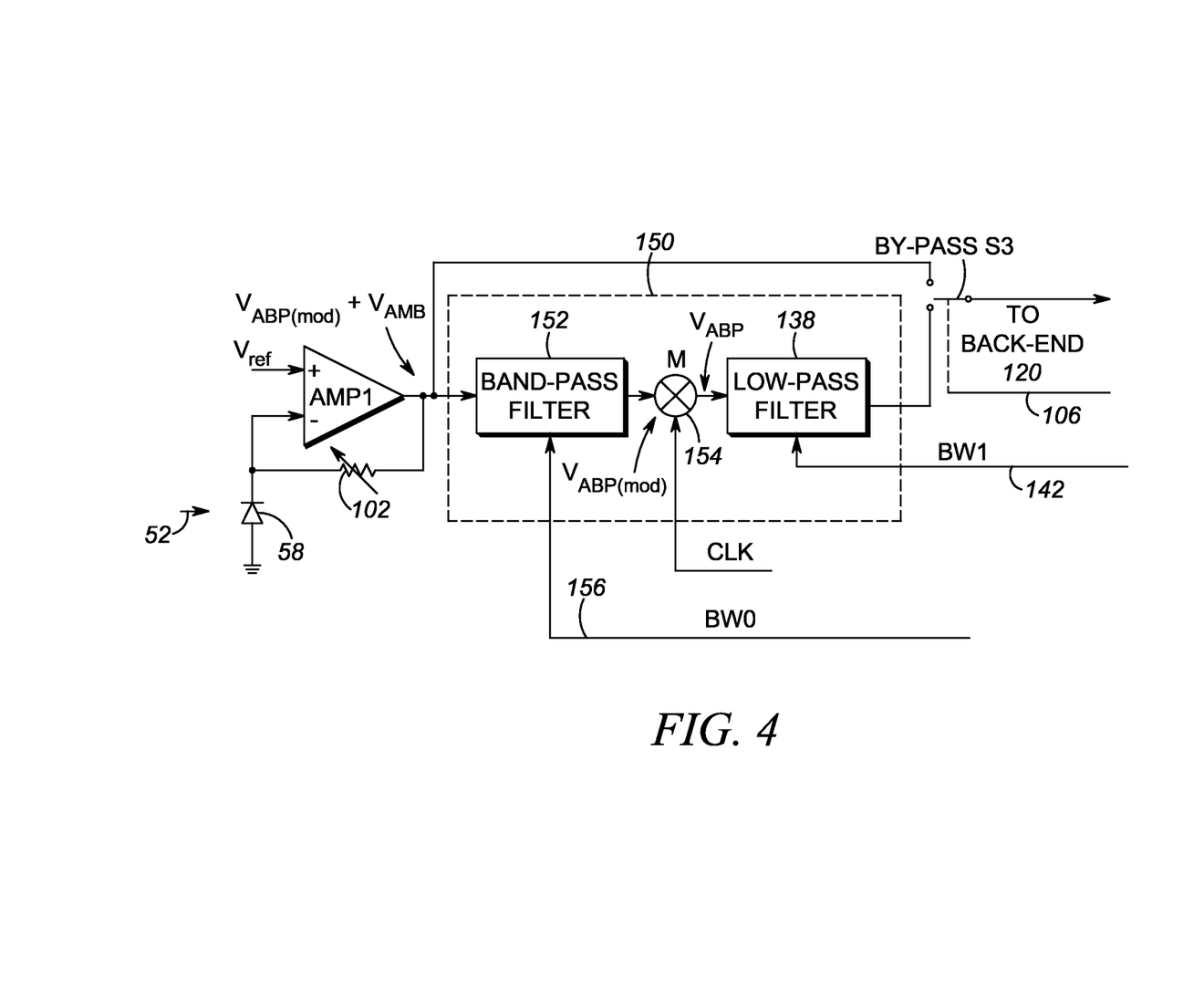
FIG. 4 is an electrical circuit schematic of part of another embodiment of a signal processing receiver circuit for use in the apparatus of FIG. 1.

FIG. 4 shows another embodiment of a noise suppression circuit 150. Like reference numerals have been used in FIG. 4 to identify like parts. Rather than using correlated double sampling as described above in FIG. 3, the received information signal is amplitude modulated by modulating the laser light source 46. The combined output signal ($V_{ABP(mod)} + V_{AMB}$) is conducted to a band-pass filter 152, which removes the interference signal $V_{AMB}$. The band-pass filter 152 has an adjustable bandwidth that is adjusted by the controller 40 via a control line 156. A mixer (M) 154 is then used to demodulate and move the modulated information signal $V_{ABP(mod)}$ back to a baseband signal $V_{ABP}$. The baseband signal $V_{ABP}$ is then filtered in the low-pass filter 138, if needed, to remove any carrier-related residue.

Figure 5:
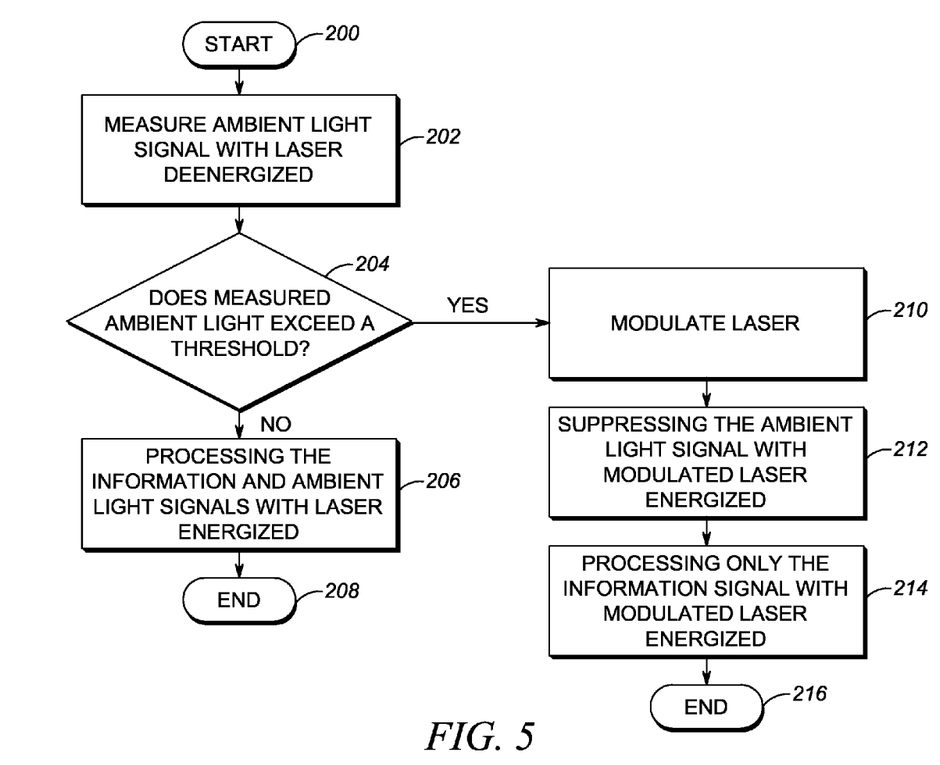
FIG. 5 is a flow chart depicting steps performed in accordance with the method of the present disclosure.

As depicted in the flow chart of FIG. 5, beginning a reading session at start step 200, the laser light source 46 is deenergized, and the ambient light signal is measured in step 202. Then, in step 204, it is determined whether the measured ambient light signal exceeds a threshold. If not, then both the information signal and the ambient light signal are processed in step 206, and the reading session ends at step 208. If yes, then the laser light source 46 is energized and modulated in step 210. Then, the ambient light signal is suppressed in step 210. Then, only the information signal processed in step 214, after which the reading session ends at step 216.

It will be understood that the default operating mode is as shown in FIG. 2, wherein the front-end receiver section 100 and the back-end receiver section 120 are utilized to process the output signal of the photodetector 58. As noted above, the suppression circuits 140, 150 add noise. In the case where modulation and a duty cycle are employed, the brightness of the outgoing laser beam is reduced. Hence, the suppression circuits 140, 150 are only made operational when they are needed, i.e., when the ambient noise level is too high to be ignored.

The threshold value for the ambient noise level is, as described above, measured when the gain of the front-end receiver section 100 and of the back-end receiver section 120 is fixed, and preferably when the AGC is turned off by the controller 40 over control line 116. As noted above, the controller 40 measures the frequency of the ambient light signal by executing a fast Fourier transform (FFT) on the ambient light signal. Prior to moving the scan component 59, if the laser light source 46 is energized, then the information signal only has a DC component, which is easily distinguished from the frequency of the ambient light signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. A reader for electro-optically reading a target in the presence of ambient light to be suppressed, comprising:
   a laser for emitting a laser beam;
   a scan component for scanning the laser beam across the target for reflection and scattering therefrom as return laser light;
   a photodetector for detecting the return laser light from the target and for converting the detected return light into an analog electrical information signal bearing information related to the target, and for concomitantly detecting the ambient light and for converting the detected ambient light into an analog electrical ambient light signal; and
   signal processing circuitry including a controller for measuring the ambient light signal, the signal processing circuitry being operative for generating the laser light without modulation when the measured ambient light signal is below a threshold to process both the information signal and the ambient light signal in one mode of operation, and for modulating the laser to generate a modulated information signal when the measured ambient light signal at least equals the threshold to suppress the ambient light signal and process only the information signal in another mode of operation.

2. The reader of claim 1, wherein the controller is operative for moving the scan component to sweep the laser beam in a scan, and wherein the controller is operative for measuring the ambient light signal prior to movement of the scan component.

3. The reader of claim 1, wherein the controller is operative for energizing the laser between an energized state and a deenergized state, and wherein the controller is operative for measuring the ambient light signal in the deenergized state of the laser.

4. The reader of claim 1, wherein the signal processing circuitry includes a correlated double sampling (CDS) circuit for suppressing the ambient light signal, and a control switch having two switching states; and wherein the controller is operative for switching the control switch to one of the switching states in which the CDS circuit is bypassed during the one mode of operation, and for switching the control switch to the other of the switching states in which both the information signal and the ambient light signal pass through the CDS circuit during the other mode of operation.

5. The reader of claim 4, wherein the CDS circuit includes a differential amplifier having one input to which both the information signal and the ambient light signal are conducted, another input to which only the information signal is conducted, and an output from which the ambient light signal has been suppressed.

6. The reader of claim 4, wherein the CDS circuit includes a demodulator for demodulating the modulated information signal during the other mode of operation.

7. The reader of claim 1, wherein the signal processing circuitry includes a bandpass filter for suppressing the ambient light signal, and a control switch having two switching states; and wherein the controller is operative for switching the control switch to one of the switching states in which the bandpass filter is bypassed during the one mode of operation, and for switching the control switch to the other of the switching states in which both the information signal and the ambient light signal are conducted to the bandpass filter during the other mode of operation.

8. The reader of claim 7, wherein, and wherein the signal processing circuitry includes a mixer for demodulating the modulated information signal during the other mode of operation.

9. The reader of claim 1, wherein the signal processing circuitry includes a digitizer for digitizing the information signal to generate a digitized signal, and wherein the controller is operative for decoding the digitized signal.

10. The reader of claim 1, wherein the signal processing circuitry has a gain; and wherein the controller is operative for fixing the gain to determine the threshold.

11. A method of electro-optically reading a target in the presence of ambient light to be suppressed, comprising:
emitting a laser beam from a laser;
scanning the laser beam across the target for reflection and scattering therefrom as return laser light;
detecting the return laser light from the target, and converting the detected return light into an analog electrical information signal bearing information related to the target;
concomitantly detecting the ambient light, and converting the detected ambient light into an analog electrical ambient light signal;
measuring the ambient light signal;
generating the laser light without modulation when the measured ambient light signal is below a threshold to process both the information signal and the ambient light signal in one mode of operation; and
modulating the laser to generate a modulated information signal when the measured ambient light signal at least equals the threshold to suppress the ambient light signal and only the information signal in another mode of operation.

12. The method of claim 11, wherein the scanning is performed by moving a scan component to sweep the laser beam in a scan, and wherein the measuring of the ambient light signal is performed prior to moving the scan component.

13. The method of claim 11, and energizing the laser between an energized state and a deenergized state, and wherein the measuring of the ambient light signal is performed in the deenergized state of the laser.

14. The method of claim 11, wherein the suppressing of the ambient light signal is performed by conducting both the information signal and the ambient light signal to a correlated double sampling (CDS) circuit.

15. The method of claim 14, and demodulating the modulated information signal during operation of the CDS circuit during the other mode of operation.

16. The method of claim 11, wherein the suppressing of the ambient light signal is performed by conducting both the information signal and the ambient light signal to a bandpass filter.

17. The method of claim 16, and demodulating the modulated information signal during operation of the bandpass filter during the other mode of operation.

18. The method of claim 11, and digitizing the information signal to generate a digitized signal, and decoding the digitized signal.

19. The method of claim 11, wherein the processing is performed by a signal processing receiver, and fixing a gain of the receiver to determine the threshold.

* * * * *